(12) United States Patent
Sasaki et al.

(10) Patent No.: US 8,324,289 B2
(45) Date of Patent: Dec. 4, 2012

(54) FLEXIBLE POLYURETHANE FOAM, PROCESS FOR ITS PRODUCTION, AND SEAT FOR AUTOMOBILE

(75) Inventors: Takayuki Sasaki, Kamisu (JP); Takashi Ito, Kamisu (JP); Yoshinori Toyota, Kamisu (JP); Akio Horie, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 305 days.

(21) Appl. No.: 11/752,600

(22) Filed: May 23, 2007

(65) Prior Publication Data

US 2007/0219284 A1 Sep. 20, 2007

Related U.S. Application Data

(63) Continuation of application No. PCT/JP2005/021480, filed on Nov. 22, 2005.

(30) Foreign Application Priority Data

Nov. 24, 2004 (JP) ................................. 2004-338815

(51) Int. Cl.
 *C08J 9/04* (2006.01)
(52) U.S. Cl. ........ 521/110; 521/112; 521/122; 521/130; 521/131; 521/137; 521/170; 521/174
(58) Field of Classification Search .................. 521/122, 521/130, 131, 133, 137, 170, 174, 110, 112
See application file for complete search history.

(56) References Cited

U.S. PATENT DOCUMENTS

| | | | | |
|---|---|---|---|---|
| 3,585,065 A | * | 6/1971 | Johnson ........................ | 525/193 |
| 3,674,721 A | * | 7/1972 | Aufdermarsh et al. ....... | 521/129 |
| 4,042,540 A | | 8/1977 | Lammerting et al. | |
| 4,350,777 A | * | 9/1982 | Henrichs et al. .............. | 521/110 |
| 4,439,548 A | * | 3/1984 | Weisman ....................... | 521/130 |
| 5,476,969 A | * | 12/1995 | Hinz et al. .................... | 564/505 |
| 6,099,955 A | | 8/2000 | Sakai et al. | |
| 6,239,186 B1 | | 5/2001 | Mansfield et al. | |
| 6,653,362 B2 | | 11/2003 | Toyota et al. | |
| 6,734,219 B2 | | 5/2004 | Wada et al. | |
| 6,756,415 B2 | | 6/2004 | Kimura et al. | |
| 2004/0152796 A1 | | 8/2004 | Muller et al. | |
| 2004/0152797 A1 | | 8/2004 | Wada et al. | |
| 2004/0229970 A1 | | 11/2004 | Sasaki et al. | |
| 2006/0160912 A1 | | 7/2006 | Sasaki et al. | |
| 2006/0160913 A1 | | 7/2006 | Sasaki et al. | |
| 2006/0205834 A1 | | 9/2006 | Sasaki et al. | |

FOREIGN PATENT DOCUMENTS

| | | |
|---|---|---|
| JP | 51-50999 | 5/1976 |
| JP | 6-87945 | 3/1994 |
| JP | 7-330843 | 12/1995 |
| JP | 9-100336 | 4/1997 |
| JP | 11-60676 | 3/1999 |
| JP | 11-171961 | 6/1999 |
| JP | 11-322875 | 11/1999 |
| JP | 2001-137077 | 5/2001 |
| JP | 2001-139653 | 5/2001 |
| JP | 2001-139657 | 5/2001 |
| JP | 2001-151841 | 6/2001 |
| JP | 2002-356528 | 12/2002 |
| JP | 2004-167233 | 6/2004 |
| JP | 2004-196875 | 7/2004 |
| JP | 2005-179653 | 7/2005 |
| WO | WO 02/069765 | 9/2002 |

OTHER PUBLICATIONS

Muscat et al., Biotechnology Techniques, vol. 7, No. 8 (Aug. 1993) pp. 591-596).*
U.S. Appl. No. 11/876,237, filed Oct. 22, 2007, Sasaki, et al.
U.S. Appl. No. 11/944,002, filed Nov. 21, 2007, Sasaki, et al.
U.S. Appl. No. 11/944,730, filed Nov. 26, 2007, Sasaki, et al.
U.S. Appl. No. 11/944,665, filed Nov. 26, 2007, Sasaki, et al.
U.S. Appl. No. 11/944,799, filed Nov. 26, 2007, Sasaki, et al.
U.S. Appl. No. 11/749,994, filed May 17, 2007, Kimura, et al.
U.S. Appl. No. 12/200,145, filed Aug. 28, 2008, Sasaki, et al.
U.S. Appl. No. 12/210,509, filed Sep. 15, 2008, Sasaki, et al.
U.S. Appl. No. 12/429,762, filed Apr. 24, 2009, Sasaki, et al.
U.S. Appl. No. 12/412,416, filed Mar. 27, 2009, Sasaki, et al.
U.S. Appl. No. 12/486,790, filed Jun. 18, 2009, Sasaki, et al.
U.S. Appl. No. 12/719,930, filed Mar. 9, 2010, Sasaki, et al.
U.S. Appl. No. 12/732,778, filed Mar. 26, 2010, Sasaki, et al.
Extended European Search Report issued Jun. 21, 2012, in Patent Application No. 05809561.3.
Office Action issued Apr. 16, 2012, in Korean Patent Application No. 10-2007-7011616.

* cited by examiner

*Primary Examiner* — John Cooney
(74) *Attorney, Agent, or Firm* — Oblon, Spivak, McClelland, Maier & Neustadt, L.L.P.

(57) ABSTRACT

A flexible polyurethane foam excellent in the vibration characteristics and the load-deflection characteristics, a process for producing the flexible polyurethane foam stably and inexpensively, and a seat for an automobile excellent in posture-stability performance and supported feeling with little bottom-hitting feeling, are provided.
When a polyoxyalkylene polyol and a polyisocyanate compound are reacted in the presence of a urethane-forming catalyst, a blowing agent and a foam stabilizer, a predetermined amount of a compound of the following formula (1) is used:

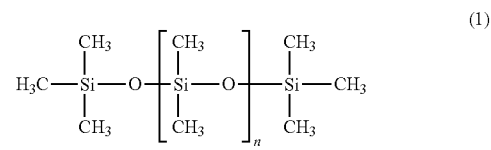

(1)

wherein the average of n is from 13 to 2,100.

19 Claims, No Drawings

FLEXIBLE POLYURETHANE FOAM, PROCESS FOR ITS PRODUCTION, AND SEAT FOR AUTOMOBILE

TECHNICAL FIELD

The present invention relates to a flexible polyurethane foam, a process for its production, and a seat for an automobile.

BACKGROUND ART

In recent years, in the field of polyurethane foams useful for various applications, various researches and developments have been made in order to improve the characteristics suitable for the respective applications. For example, along with upgrading of automobile seats in order to improve the riding comfort of seat cushion, it is targeted to improve the rebound resilience, vibration characteristics, durability, etc. With respect to the vibration characteristics, the influence of car body vibration over a human body varies depending upon the vibration frequency. However, it is considered effective for improvement of the riding comfort to take damping of vibration particularly large in a frequency range (for example from 4 to 8 Hz or from 6 to 20 Hz) to which a human is sensitive. Further, it is considered that in order to improve these characteristics, a seat cushion is effective which employs a polyoxyalkylene polyol having a higher molecular weight than one heretofore produced.

On the other hand, as a seat cushion, a combination of a metal spring with a pad material made of a flexible polyurethane foam (hereinafter referred to simply as a flexible foam) has been used in many cases. However, in recent years, there has been a trend of employing an automobile seat so-called a deep foam type whereby a metal spring is abolished by imparting spring characteristics to the flexible foam itself to meet the demand for e.g. cost down, reduction of weight, etc. The deep foam type seat has become thick, since no metal spring is used in combination. Further, the characteristics of the flexible foam have become a factor substantially influential over the sitting comfort and riding comfort of the seat. Namely, the static characteristics and dynamic characteristics as indices for the sitting comfort and riding comfort, have been regarded as important in the development of flexible foams. Among the static characteristics, it is particularly important to control the supported feeling at the initial stage of sitting and the bottom-hitting feeling at the final stage of sitting.

When a person actually sits on a seat provided with a pad material of flexible foam, the flexible foam will be compressed and deflected, and the position of e.g. the hip will sink to a certain height. As a method for measuring this static characteristic (the static sitting feeling), a test method may be employed wherein the deflection is measured in a load test in accordance with a performance test method for a pad material for an automobile seat according to JASO automobile standard B408-89 (1989), to obtain a load-deflection curve, or the deflection under a load of 500 N (Newton Load) may be used which is obtained from a load-deflection curve obtained by the measurement employing a pressure plate in accordance with JIS E7104 (2002). This pressure plate is oval with a long diameter A of 300 mm, a short diameter B of 250 mm and a thickness C of at least 35 mm and is so-called Tekken Plate.

On the other hand, the polyoxyalkylene polyol to be used as a material for the flexible foam, is usually produced by ring opening polymerization of an alkylene oxide such as propylene oxide, which is carried out by using a sodium/potassium catalyst such as sodium hydroxide or potassium hydroxide and an initiator such as a polyhydric alcohol. By this production method, an unsaturated monool having an unsaturated bond (hereinafter referred to simply as a monool) will be formed as a by-product, and the amount of such a monool produced, will increase with an increase of the molecular weight of the polyoxyalkylene polyol (a decrease of the hydroxyl value).

In the case of a polyoxyalkylene polyol having a hydroxyl value of about 56 mgKOH/g which is commonly used as a material for elastic polyurethane foams, the amount of such a monool produced, is not so large as to bring about a problem. However, in the case of a polyoxyalkylene polyol having a high molecular weight and a low hydroxyl value, the amount of such a monool produced, will be problematic. Namely, in a case where an elastic polyurethane foam is produced by using a polyoxyalkylene polyol having a large monool content (a high total unsaturation value), there will be a problem such as a decrease in hardness or a decrease in compression set of the produced foam, or a decrease in the curing property at the time of production of the foam. Further, even if it is attempted to produce a polyoxyalkylene polyol having a low hydroxyl value by using a sodium/potassium catalyst, the amount of the monool produced will be so large that such production will be practically difficult.

Under the circumstances, a method has been proposed wherein in order to improve the characteristics such as the riding comfort, durability, etc. for an automobile seat, a polyoxyalkylene polyol having a low monool content is used for the production of an elastic polyurethane foam (Patent Document 1).

However, it has been found that an elastic polyurethane foam represented by a deep foam type produced by using a polyoxyalkylene polyol having a low monool content, has an extremely high rebound resilience (rebound resilience of core portion: 71 to 74%), whereby the riding comfort is inadequate from the viewpoint of the occupant posture-stability performance or supporting performance during traveling. In order to solve such problems, an invention has been proposed to suppress the rebound resilience by a combined use of a polyoxyalkylene polyol having a low unsaturation value and a polyoxyalkylene polyol having a low molecular weight with a hydroxyl value of from 90 to 300 mgKOH/g (Patent Document 2), but the hysteresis loss has been relatively large at a level of from 25 to 33%, such being disadvantageous from the viewpoint of the durability.

Further, with a seat of the above-mentioned deep is foam type structure, the load-deflection characteristics are substantially influenced by the flexible foam itself, and it will be a seat having a relatively small difference in deflection on pressure side of from 500 N to 900 N, when the deflection under load is measured when it is pressed by the above-mentioned pressure plate from above. A seat having a small difference in deflection presents a bottom-hitting feeling and thus showed a tendency that the evaluation of the riding comfort was poor. Therefore, with a seat of deep foam type, in order to increase the difference in deflection, the thickness of the foam was increased. As a technique to increase the difference in deflection without increasing the thickness of the foam, it was proposed to use a fluorinated surfactant having a perfluoroalkyl group structure (Patent Document 3) However, a problem has been pointed out such that the effects tend to be different depending upon the structure of the fluorinated surfactant.

On the other hand, as a method of producing a flexible polyurethane foam having a high elasticity, it is known to use a method of using from 0.003 to 2 parts by mass of dimethylpolysiloxane per 100 parts by mass of a polyether (Patent Document 4). However, since conditions for producing the foam is very susceptible to the polymerization degree (molecular weight) of dimethylpolysiloxane, dimethylpolysiloxane having a polymerization degree exceeding 10 cannot be used for the production of the foam. Further, even if a dimethylpolysiloxane having a polymerization degree of at most 10 is used, it is difficult to produce the foam stably.

Further, as a flexible polyurethane foam having its transmissibility at resonance frequency lowered, a flexible polyurethane foam produced by using a silicone foam stabilizer of which the main component of the silicone component is dimethylpolysiloxane, is known (Patent Documents 5 and 6). However, the silicone foam stabilizer is a mixture comprising dimethylpolysiloxane and a plasticizer, and the content of the plasticizer is about 90 mass %. Therefore, it is difficult to distinguish whether an actual effect to be obtained is derived from dimethylpolysiloxane or the plasticizer.

Furthermore, a technique to increase the density of the surface skin layer of the foam by using a known defoaming agent, has been known (Patent Document 7). This technique is particularly applied to an integral skin foam and is substantially different from the present invention.

Patent Document 1: JP-A-7-330843
Patent Document 2: JP-A-11-60676
Patent Document 3: JP-A-11-322875
Patent Document 4: JP-A-51-50999
Patent Document 5: JP-A-2001-137077
Patent Document 6: JP-A-2001-139657
Patent Document 7: JP-A-6-87945

DISCLOSURE OF THE INVENTION

Object to be Accomplished by the Invention

The present invention provides a flexible polyurethane foam excellent in the vibration characteristics and the load-deflection characteristics, a process for producing the flexible polyurethane foam stably and inexpensively, and a seat for an automobile excellent in the occupant posture-stability performance and the supported feeling with little bottom-hitting feeling.

Means to Accomplish the Object

The gist of the present invention is as follows.
1. A flexible polyurethane foam obtainable by reacting a high molecular weight polyoxyalkylene polyol or a polymer-dispersed polyol containing fine polymer particles in the high molecular weight polyoxyalkylene polyol, with a polyisocyanate compound in the presence of a catalyst, a blowing agent and a foam stabilizer, characterized in that a compound represented by the following formula (1) is used in an amount of from 0.0001 to 1 part by mass per 100 parts by mass of all active hydrogen compounds:

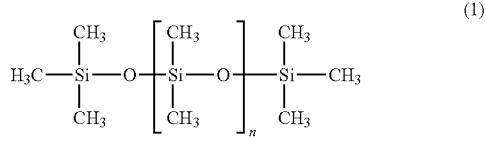
(1)

2. A process for producing a flexible polyurethane foam, which comprises reacting a high molecular weight polyoxyalkylene polyol or a polymer-dispersed polyol containing fine polymer particles in the high molecular weight polyoxyalkylene polyol, with a polyisocyanate compound in the presence of a catalyst, a blowing agent and a foam stabilizer, characterized in that a compound represented by the formula (1) is used in an amount of from 0.0001 to 1 part by mass per 100 parts by mass of all active hydrogen compounds.

3. The flexible polyurethane foam having a core density of preferably from 30 to 70 kg/m$^3$.

4. With respect to a flexible polyurethane foam obtained by foaming into a thickness of 100 mm, the 25% hardness (ILD) X (N/314 cm$^2$) measured in accordance with JIS K6400 (1997) and Y (mm) i.e. the value (difference in deflection on pressure side) obtained by subtracting the deflection on 500 N pressure side from the deflection on 900 N pressure side obtained from a load-deflection curve as measured by means of a pressure plate (Tekken Plate) in accordance with JIS E7104 (2002), preferably satisfy a relation formula represented by the following formula (2):

$$Y \geq -0.000370842X^2 + 0.225401X - 10.5013 \quad (2)$$

5. With respect to a flexible polyurethane foam obtained by foaming into a thickness of 100 mm, when the deflection on 500 N pressure side obtained from a load-deflection curve as measured by means of a pressure plate (Tekken Plate) in accordance with JIS E7104 (2002), is from 5.0 to 55.0 mm, Y (mm) i.e. the value (the difference in deflection on pressure side) obtained by subtracting the deflection on 500 N pressure side from the deflection on 900 N pressure side, is preferably from 22.5 to 33.0 mm.

6. A seat for an automobile, which is made of the above flexible polyurethane foam.

Effects of the Invention

The flexible polyurethane foam of the present invention is excellent in the vibration characteristics and the load-deflection characteristics.

Further, according to the process for producing a flexible polyurethane foam of the present invention, it is possible to produce a flexible polyurethane foam excellent in the vibration characteristics, load-deflection characteristics and durability, stably and inexpensively. Furthermore, the seat for an automobile of the present invention is a comfortable seat excellent in the posture-stability performance and the supported feeling with little bottom-hitting feeling.

BEST MODE FOR CARRYING OUT THE INVENTION

The flexible polyurethane foam of the present invention is obtainable by reacting a polyol and a polyisocyanate compound in the presence of a catalyst, a foam stabilizer and a blowing agent.

Hereinafter, each material will be described.
(Polyol)
High Molecular Weight Polyoxyalkylene Polyol The high molecular weight polyoxyalkylene polyol to be used for producing the flexible polyurethane foam of the present invention, is preferably one obtained by ring opening addition polymerization of a cyclic ether to an initiator in the presence of a ring opening addition polymerization catalyst.

The average number of hydroxyl groups in the high molecular weight polyoxyalkylene polyol is the average number of hydroxyl groups in the initiator used. Further, the high molecular weight polyoxyalkylene polyol is regarded as having a molecular weight calculated by the following formula based on the hydroxyl value measured in accordance with JIS K-1557:

Molecular weight=(56100×the number of hydroxyl groups in the polyol)/hydroxyl value The ring opening addition polymerization catalyst may, for example, be an alkali metal compound catalyst such as a potassium compound (potassium hydroxide, potassium methoxide or the like) or a cesium compound (cesium metal, cesium hydroxide, cesium carbonate, cesium methoxide or the like); a cationic polymerization catalyst (boron trifluoride or the like); a double metal cyanide complex catalyst; or a phosphazenium compound. Among these ring opening addition polymerization catalysts, an alkali metal compound catalyst or a double metal cyanide complex catalyst is preferred, and in order to obtain a polyoxyalkylene polyol having a large molecular weight, a double metal cyanide complex catalyst is particularly preferred.

The double metal cyanide complex catalyst is preferably a complex containing zinc hexacyanocobaltate as the main component since it has a high polymerization activity, and an ether and/or an alcohol complex is particularly preferred in view of its high activity. As the ether, ethylene glycol dimethyl ether (glyme), diethylene glycol dimethyl ether (diglyme), monoethylene glycol mono-tert-butyl ether (METB) or the like is preferred. Among them, glyme and METB are particularly preferred since the complex can be easily handled at the time of production. As the alcohol, tert-butyl alcohol is particularly preferred since a high activity catalyst is obtainable.

The amount of the double metal cyanide complex catalyst to be used is preferably from 0.001 to 0.05 part by mass per 100 parts by mass of the polyoxyalkylene polyol to be obtained, particularly preferably from 0.001 to 0.03 part by mass with a view to providing an excellent storage stability of a product, and such amount is economically advantageous.

On the other hand, the amount of the alkali metal compound catalyst to be used is preferably from 0.1 to 0.5 part by mass per 100 parts by mass of the polyoxyalkylene polyol to be obtained.

The initiator may, for example, be ethylene glycol, diethylene glycol, dipropylene glycol, neopentyl glycol, 1,4-butanediol, 1,6-hexanediol, glycerol, trimethylolpropane, pentaerythritol, diglycerol, dextrose, sucrose, bisphenol A or the like, or a compound obtained by adding a small amount of an alkylene oxide to the above initiators. The initiators may be used in combination of two or more of them.

The number of active hydrogen atoms in the initiator is preferably from 2 to 6. By setting the number of active hydrogen atoms to at least 2, the durability of the flexible polyurethane foam and the riding comfort of the seat cushion will be good. And by setting the number of active hydrogen atoms to at most 6, the flexible polyurethane foam will not be hard and will have favorable mechanical properties such as elongation.

As the cyclic ether, an alkylene oxide having at least 2 carbon atoms is preferred. The alkylene oxide having at least 2 carbon atoms may, for example, be ethylene oxide, propylene oxide, 1,2-butylene oxide, 2,3-butylene oxide or styrene oxide. Among them, a combination of ethylene oxide and at least one member selected from propylene oxide, 1,2-butylene oxide and 2,3-butylene oxide is particularly preferred.

The polyoxyalkylene polyol preferably has an oxyethylene group in the middle of its molecular chain and/or at its molecular terminal, particularly preferably has an oxyethylene group at its molecular terminal.

The polyoxyalkylene polyol having an oxyethylene group in the middle of its molecular chain may be one having an oxyethylene block chain in the middle of its molecular chain, which is obtained by subjecting one of an alkylene oxide having at least 3 carbon atoms and ethylene oxide to ring opening addition polymerization to an initiator, then further subjecting the other to ring opening addition polymerization, and ultimately subjecting an alkylene oxide having at least 3 carbon atoms to ring opening addition polymerization; or a polyoxyalkylene polyol having an oxyethylene oxyalkylene random chain in the middle of its molecular chain, which is obtained by randomly subjecting an alkylene oxide having at least 3 carbon atoms and ethylene oxide to ring opening addition polymerization to an initiator.

The polyoxyalkylene polyol having an oxyethylene group at its molecular terminal, may be a polyoxyalkylene polyol having a terminal oxyethylene block chain, which is obtained by ring opening addition polymerization of an alkylene oxide having at least 3 carbon atoms to an initiator, and subjecting ethylene oxide to ring opening polymerization; or a polyoxyalkylene polyol having a terminal oxyethylene block chain, which is obtained by further subjecting ethylene oxide to ring opening polymerization to a polyoxyalkylene polyol having an oxyethylene group in the middle of its molecular chain.

The content of all oxyethylene groups in the polyoxyalkylene polyol (100 mass %) excluding a cell opener described hereinafter is preferably at most 30 mass %, particularly preferably at most 25 mass %. By setting the content of the oxyethylene groups to at most 30 mass %, the number of closed cells in the flexible polyurethane foam will decrease, whereby it is possible to suppress cracks formed at the time of a crushing treatment or shrinkage or the like after the crushing treatment.

The lower limit of the content of the terminal oxyethylene group in the polyoxyalkylene polyol excluding a cell opener described hereinafter is preferably 3 mass %, particularly preferably 5 mass %. The upper limit is preferably 25 mass %. If the content of the terminal oxyethylene group is less than 3 mass %, collapse of the foam, etc. tend to occur. On the other hand, if it exceeds 25 mass %, closed cells in the foam tend to increase, whereby the foam is likely to break at the time of crushing treatment, or shrinkage or the like is likely to occur after the crushing treatment.

The average number of hydroxyl groups in the high molecular weight polyoxyalkylene polyol is preferably from 2 to 6, and particularly preferably from 3 to 4. When the average number of hydroxyl groups is at least 2, the durability of the flexible polyurethane foam and the sitting comfort of the seat cushion will be good. Further, by setting the average number of hydroxyl groups to at most 6, the flexible polyurethane foam will not be hard, whereby mechanical properties such as elongation will be good.

The hydroxyl value of the high molecular weight polyoxyalkylene polyol is preferably from 10 to 112 mgKOH/g, more preferably from 10 to 80 mgKOH/g, particularly preferably from 20 to 60 mgKOH/g, and most preferably from 20 to 40 mgKOH/g. By setting the hydroxyl value to at least 10 mgKOH/g, the viscosity of the polyol will not be high, whereby the workability at the time of production will be good. By setting the hydroxyl value to at most 112 mgKOH/g, the durability of the flexible polyurethane foam and the sitting comfort of the seat cushion will be good.

In the present invention, it is preferred to use a polyoxyalkylene polyol (a) (hereinafter sometimes referred to as polyol (a)) as at least a part of the high molecular weight polyoxyalkylene polyol. The polyol (a) is a polyoxyalkylene polyol having a hydroxyl value of from 10 to 112 mgKOH/g and having a total unsaturation value (USV) of at most 0.08 meq/g.

The hydroxyl value of the polyol (a) is preferably at most 112 mgKOH/g, more preferably from 10 to 80 mgKOH/g, particularly preferably from 20 to 60 mgKOH/g, and most preferably from 20 to 40 mgKOH/g. By setting the hydroxyl value to at least 10 mgKOH/g, the viscosity of the polyol will not be high, whereby the workability at the time of production will be good. By setting the hydroxyl value to at most 112 mgKOH/g, the durability of the flexible polyurethane foam and the sitting comfort of the seat cushion will be good.

The total unsaturation value of the polyol (a) is at most 0.08 meq/g, preferably at most 0.07 meq/g, and particularly preferably at most 0.05 meq/g. By setting the total unsaturation value of the polyol (a) to at most 0.08 meq/g, the durability of the flexible polyurethane foam and the sitting comfort of the seat cushion will be good.

In order to obtain a polyol having such a total unsaturation value, among the above ring opening addition polymerization catalysts, it is preferred to use any of a cesium alkoxide compound, a phosphazenium compound and a double metal cyanide catalyst, and it is particularly preferred to use either of a cesium alkoxide compound and a double metal cyanide catalyst.

The average number of hydroxyl groups in the polyol (a) is preferably from 2 to 6, more preferably from 2 to 4. The polyol (a) may be used alone or may be used as a mixture obtained by mixing two or more of polyols having a hydroxyl value of from 10 to 80 mgKOH/g and having a total unsaturation value of at most 0.08 meq/g. Further, the polyol (a) may be one produced by using such a mixture as an initiator.

The polyol (a) is preferably one having an oxyethylene group, and the content of all oxyethylene groups in the polyol (a) (100 mass %) is preferably at most 30 mass %, particularly preferably at most 25 mass %. By setting the content of the oxyethylene groups to at most 30 mass %, closed cells in the flexible polyurethane foam will decrease, whereby cracks of the foam at the time of the crushing treatment or shrinkage or the like after the crushing treatment can be suppressed.

The polyol (a) is particularly preferably one having an oxyethylene group at its terminal, and the lower limit of the content of the terminal oxyethylene group in the polyol (a) is preferably 3 mass %, particularly preferably 5 mass %. The upper limit is preferably 25 mass %. If the content of the terminal oxyethylene group is less than 3 mass %, collapse of the foam, etc. tend to occur. On the other hand, if it exceeds 25 mass %, closed cells in the foam tend to increase, whereby the foam is likely to break at the time of crushing treatment, or shrinkage or the like is likely to occur after the crushing treatment.

The content of the high molecular weight polyoxyalkylene polyol (a) is preferably from 30 to 100 is mass %, particularly preferably from 40 to 100 mass %, in the high molecular weight polyoxyalkylene polyol (100 mass %) Further, in a case where the high molecular weight polyoxyalkylene polyol contains fine polymer particles described hereinafter, the ratio of the high molecular weight polyoxyalkylene polyol and the polyol (a) is calculated on the basis of the mass of the polyols excluding the fine polymer particles therefrom.

Cell Opener

Further, in the present invention, for at least a part of the high molecular weight polyoxyalkylene polyol, a so-called cell opener which is a polyoxyalkylene polyol (hereinafter sometimes referred to as cell opener) having a high oxyethylene group content, may be used.

As the cell opener, a polyoxyalkylene polyol having an average number of hydroxyl groups of from 2 to 8, having a hydroxyl value of from 20 to 100 mgKOH/g (more preferably from 20 to 80 mgKOH/g), and having a content of oxyalkylene groups of from 50 to 100 mass % in the polyoxyalkylene polyol (100 mass %), is preferred. The amount of such a cell opener to be used is preferably from 0.01 to 10 parts by mass, particularly preferably from 0.05 to 10 parts by mass, per 100 parts by mass of the high molecular weight polyoxyalkylene polyol. Further, in a case where the high molecular weight polyoxyalkylene polyol contains fine polymer particles described hereinafter, the ratio of the cell opener in is the high molecular weight polyoxyalkylene polyol is calculated on the basis of the mass of the polyols excluding the fine polymer particles therefrom.

Polymer-Dispersed Polyol

In the present invention, a polymer-dispersed polyol in which fine polymer particles are contained in the high molecular weight polyoxyalkylene polyol, may be used. The polymer-dispersed polyol contains fine polymer particles in a polyoxyalkylene polyol matrix, and the fine polymer particles are preferably contained as dispersed. As the fine polymer particles, an addition polymerization type polymer or a condensation polymerization type polymer is preferred.

As a polymer in the fine polymer particles, the addition polymerization type polymer or the condensation polymerization type polymer may be mentioned. The addition polymerization type polymer may, for example, be a homopolymer or copolymer of a vinyl monomer such as acrylonitrile, styrene, a methacrylic acid ester or an acrylic acid ester. The condensation polymerization type polymer may, for example, be polyester, polyurea, polyurethane or melamine resin. By the presence of the fine polymer particles, the hydroxyl value of the entire polymer-dispersed polyol can be made lower than the hydroxyl value of the matrix polyol. Such a polymer-dispersed polyol can be produced by a known method and can be produced by polymerizing monomers in the high molecular weight polyoxyalkylene polyol. And further, the polymer-dispersed polyol can be produced in such a manner that monomers are polymerized in a solvent to produce a solution of fine polymer particles separately, then this solution is mixed with a high molecular weight polyoxyalkylene polyol, and then the solvent is removed therefrom. Furthermore, the polymer-dispersed polyol can be produced in such a manner that monomers are polymerized in a part of the high molecular weight polyoxyalkylene polyol, and the polymer-dispersed polyol thus obtained is mixed with another high molecular weight polyoxyalkylene polyol.

The content of the fine polymer particles contained in the high molecular weight polyoxyalkylene polyol is preferably at most 50 mass %. By setting the content of the fine polymer particles to at most 50 mass %, the viscosity of the polyol will not be high, whereby the workability during production will be good. The content of the fine polymer particles is preferably from 1 to 35 mass % in the total amount of the polyol (100 mass %) containing the fine polymer particles.

(Polyisocyanate Compound)

As the polyisocyanate compound, an aromatic polyisocyanate compound is preferred. The aromatic polyisocyanate compound may, for example, be tolylene diisocyanate (TDI), diphenylmethane diisocyanate (MDI) or polymethylenepolyphenyl polyisocyanate (crude MDI). These polyisocyanate compounds may be a mixture, and a mixture of TDI and crude MDI (TDI/crude MDI=85/15 to 75/25 (mass ratio)) is particularly preferred.

The amount of the polyisocyanate compound to be used is such that the numerical value (referred to as an isocyanate index) represented by 100 times the ratio of the number of isocyanate groups to the total number of active hydrogen such as the polyol and water in the materials of the flexible polyurethane foam, is preferably from 80 to 120, particularly preferably from 85 to 115.

(Catalyst)

As the catalyst of the present invention, a catalyst which accelerates the urethane-forming reaction may be used. For example, a tertiary amine such as triethylene diamine or bis(2-dimethylaminoethyl)ether; a metal carboxylate such as potassium acetate or potassium 2-ethylhexanoate; or an organic metal compound such as dibutyl tin dilaurate or stannous octoate may be mentioned.

The amount of the catalyst to be used is preferably from 0.01 to 5 parts by mass, particularly preferably from 0.1 to 1 part by mass, per 100 parts by mass of the total amount of the polyol containing fine polymer particles.

(Dimethylpolysiloxane)

In the present invention, a compound represented by the above formula (1) (hereinafter sometimes referred to as dimethylpolysiloxane) is used.

In the above formula (1), the average of n is from 13 to 2,100, preferably from 15 to 2,100, particularly preferably from 21 to 1,000. By setting the average of n to be at most 2,100, the foam stability at the time of foaming will be good. Further, by setting the average of n to be from 13 to 2,100, the difference in deflection on pressure side obtained by subtracting the deflection on 500 N pressure side from the deflection on 900 N pressure side obtained from a load-deflection curve as measured by means of a pressure plate (Tekken Plate) in accordance with JIS E7104 can be obtained stably. By setting the average of n to be from 21 to 1,000, the difference in deflection on pressure side can be most stably secured.

In the present invention, the average of n i.e. the polymerization degree, can be determined on the basis of the kinematic viscosity of dimethylpolysiloxane measured at 25° C. by employing Ubbelohde viscometer as disclosed in JIS Z8803-1991 5.2.3 by using a graph provided in "the relation among the molecular weight, polymerization degree and viscosity of dimethyl silicone oil" at p. 116 of "Silicone Handbook", First Edition, edited by Kunio Ito, published by Nikkan Kogyo shimbun, Ltd. on Aug. 31, 1990".

The amount of dimethylpolysiloxane to be used is from 0.0001 to 1 part by mass, particularly preferably from 0.0003 to 0.1 part by mass, per 100 parts by mass of all active hydrogen compounds. The active hydrogen compound is a compound that can react with a polyisocyanate compound among the materials of the flexible polyurethane foam, and such a compound may, for example, be a polyol, a crosslinking agent or water as a blowing agent. By setting the amount of dimethylpolysiloxane to be used to at least 0.0001 part by mass per 100 parts by mass of the compound that can react with a polyisocyanate compound, the difference in deflection on pressure side can be stably secured. And by setting the amount of dimethylpolysiloxane to be used to at most 1 part by mass, the foam stability at the time of foaming will not be deteriorated.

(Foam Stabilizer)

As a foam stabilizer of the present invention, a foam stabilizer which is used in the production of a common flexible polyurethane foam, may be used together, and particularly preferably a silicone foam stabilizer is used. The amount of the foam stabilizer to be used is preferably from 0.001 to 3 parts by mass per 100 parts by mass of the total amount of the polyol containing fine polymer particles.

(Blowing Agent)

As a blowing agent, at least one blowing agent selected from water and an inert gas is preferably used, and water is particularly preferred. As the inert gas, is air, nitrogen or carbon dioxide may, for example, be mentioned.

The amount of such a blowing agent to be used is not particularly limited, and in a case where only water is used, its amount is preferably at most 10 parts by mass, particularly preferably from 0.1 to 8 parts by mass, per 100 parts by mass of the total amount of the polyol containing fine polymer particles. A blowing agent other than water may also be used in combination in a proper amount depending upon the requirement for e.g. expansion ratio.

(Crosslinking Agent)

In the present invention, a crosslinking agent may be used. As the crosslinking agent, a polyol having an average number of hydroxyl groups of from 2 to 8 and having a hydroxyl value of from 200 to 2,000 mgKOH/g is preferred. The amount of the crosslinking agent to be used is preferably from 0.1 to 10 parts by mass, more preferably from 0.5 to 10 parts by mass, per 100 parts by mass of the total amount of the polyol containing fine polymer particles.

(Others)

In the present invention, various known additives and adjuvants may be used as the case requires, such as an emulsifier; an aging preventive agent such as an antioxidant or an ultraviolet absorber; a filler such as calcium carbonate or barium sulfate; a flame retardant, a plasticizer, a colorant and an anti-fungus agent.

(Process for Producing Flexible Polyurethane Foam)

The production and molding of the flexible polyurethane foam is preferably carried out by a method of injecting a reactive mixture directly into a mold by means of a low pressure foaming machine or a high pressure foaming machine (i.e. a reactive injection molding method) or a method of injecting the reactive mixture into an open state mold. The high pressure foaming machine is usually preferably of a type in which two liquids are mixed, and one liquid is a polyisocyanate compound, and the other liquid is a mixture of all materials other than the polyisocyanate compound. In some cases, a total of three reactive mixtures having a catalyst, a cell opener (which is usually used as dispersed or dissolved in a part of the polyoxyalkylene polyol), etc. as a separate component, may be prepared.

The flexible polyurethane foam of the present invention is usually produced by a cold curing method, but it may be produced also by a method other than the cold curing method, such as a method containing a heating step.

(Flexible Polyurethane Foam)

The core density of the flexible polyurethane foam of the present invention is preferably from 30 to 70 kg/m$^3$, and in order to employ it as a seat cushion for an automobile, the core density is particularly preferably from 35 to 60 kg/m$^3$. When the core density is at least 30 kg/m$^3$, the durability of the flexible polyurethane foam and the riding comfort performance of the seat cushion will be further improved. Further, when the core density is at most 70 kg/m$^3$, when the flexible polyurethane foam having such a core density is applied to a seat cushion for an automobile, such a density will not hinder the improvement of the fuel cost. The measurement of the core density is carried out in accordance with JIS K6400 (1997). For the measurement of the core density, a sample obtained by removing the skin portion (edge portion) from the center portion of the flexible polyurethane foam and cutting the polyurethane foam into a size of 100 mm in length and width and 50 mm in height is used.

The flexible polyurethane foam of the present invention is such that with respect to a foam obtained by foaming into a thickness of 100 mm, the hardness (25% hardness) when the foam is compressed into a thickness of 25% of the original foam thickness is preferably from 180 to 500 N/314 cm², particularly preferably from 180 to 400 N/314 cm². When the 25% hardness is at least 180 N/314 cm². When the 25% hardness is at least 180 N/314 cm², the supported feeling of occupant will be further improved. When the 25% hardness is at most 500 N/314 cm², the deflection of the flexible polyurethane foam becomes sufficiently large, thus leading to an increase of the riding comfort. The measurement of the 25% hardness is carried out in accordance with JIS K6400 (1997).

The flexible polyurethane foam of the present invention is preferably such that with respect to a flexible polyurethane foam obtained by foaming into a thickness of 100 mm, X (N/314 cm²) i.e. the 25% hardness (ILD) measured in accordance with JIS K6400 (1997) and Y (mm) i.e. the value (difference in deflection on pressure side) obtained by subtracting the deflection on 500 N pressure side from the deflection on 900 N pressure side obtained from a load-deflection curve measured by means of a pressure plate (Tekken Plate) in accordance with JIS E7104 (2002) by applying a load at a constant rate of at most 10 mm/sec, satisfy a relation formula represented by the following formula (2):

$$Y \geq -0.000370842X^2 + 0.225401X - 10.5013 \quad (2)$$

By satisfying the range of the above relation formula, it is possible to secure a sufficient deflection as a seat cushion.

Further, the flexible polyurethane foam of the present invention is preferably such that with respect to a foam obtained by foaming into a thickness of 100 mm, when the deflection on 500 N pressure side obtained from a load-deflection curve as measured by means of a pressure plate (Tekken Plate) in accordance with JIS E7104 (2002) by applying a load at a constant rate of at most 10 mm/sec, is from 5.0 to 55.0 mm, Y (mm) i.e. the value (the difference in deflection on pressure side) obtained by subtracting the deflection on 500 N pressure side from the deflection on 900 N pressure side, is from 22.5 to 33.0 mm, particularly preferably from 27.0 to 33.0 mm.

When the deflection on the 500 N pressure side is from 5.0 to 55.0 mm, if Y (mm) i.e. the value (the difference in deflection on pressure side) obtained by subtracting the deflection on 500 N pressure side from the deflection on 900 N pressure side in a foam thickness of 100 mm, is less than 22.5 mm, the bottom-hitting feeling of the seat tends to slightly result, such being undesirable. On the other hand, if the Y i.e. the difference (mm) in deflection on pressure side exceeds 33.0 mm, the posture-stability performance tends to be poor, such being undesirable.

The flexible polyurethane foam of the present invention is further preferably such that with respect to a foam obtained by foaming into a thickness of 100 mm, when the deflection on 500 N pressure side obtained from a load-deflection curve measured by means of a pressure plate (Tekken Plate) in accordance with JIS E7104 (2002) by applying a load at a constant rate of at most 10 mm/sec, is from 18.0 to 55.0 mm, Y (mm) i.e. the value (the difference in deflection on pressure side) obtained by subtracting the deflection on 500 N pressure side from the deflection on 900 N pressure side, is from 22.5 to 33.0 mm, more preferably from 27.0 to 33.0 mm.

(Mechanism)

In the process for producing a flexible polyurethane foam of the present invention described above, since a compound represented by the formula (1) i.e. dimethylpolysiloxane, is used, the size of cells in the flexible polyurethane foam to be obtained does not become uniform. In a flexible polyurethane foam having nonuniform cell sizes, when a load is being applied thereto, relatively large cells are unlikely to be compressed, whereby the flexible polyurethane foam can deflect even under a heavy load. As a result, a difference in deflection on pressure side becomes large. Further, a flexible polyurethane foam having nonuniform cell sizes hardly resonates, and therefore it is excellent in the vibration characteristics.

Further, in the process for producing a flexible polyurethane foam of the present invention, since a foam stabilizer, which is used for producing a common flexible polyurethane foam, is used together with dimethylpolysiloxane, even though dimethylpolysiloxane is used, a flexible polyurethane foam can be produced stably, and in particular, a production of a flexible polyurethane foam by using dimethylpolysiloxane having a polymerization degree of at least 10, which has been difficult to produce, has become possible.

Further, a flexible polyurethane foam can be produced inexpensively as compared with a conventional production process using a fluorinated surfactant.

Furthermore, a seat for an automobile of the present invention provided with a seat cushion made of the flexible polyurethane foam excellent in the vibration characteristics and the load-deflection characteristics, is excellent in the posture-stability performance and the supported feeling, provides little bottom-hitting feeling, and provides a good sitting comfort.

EXAMPLES

Now, the present invention will be described in further detail with reference to Examples, but the present invention is by no means restricted to the following Examples. Further, numerical values in Examples and Comparative Examples represent part(s) by mass.

(Materials)

Polyol a1: a polyoxypropylene oxyethylene polyol obtained in such a manner that propylene oxide is subjected to ring opening addition polymerization to glycerol as an initiator by using a potassium hydroxide catalyst, followed by purification to obtain a polyoxypropylene polyol having a molecular weight of 1,000, then propylene oxide is further subjected to ring opening addition polymerization by using a cesium hydroxide catalyst, and then ethylene oxide is subjected to ring opening addition polymerization. The number of functional groups is 3; the hydroxyl value is 24 mgKOH/g; the unsaturation value is 0.04 meq/g; and the amount of terminal oxyethylene block groups is 16 mass %.

Polyol a2: a polymer-dispersed polyol having an amount of fine polymer particles of 20 mass %, which is obtained by polymerizing acrylonitrile in the polyol a1.

Polyol a3: a polyoxypropylene oxyethylene polyol obtained in such a manner that propylene oxide is subjected to ring opening addition polymerization to glycerol as an initiator by using a potassium hydroxide catalyst, then ethylene oxide is subjected to ring opening addition polymerization to the terminal. The number of functional groups is 3; the hydroxyl value is 28 mgKOH/g; the unsaturation value is 0.06 meq/g; and the amount of terminal oxyethylene block groups is 15 mass %.

Polyol a4: a polyoxypropylene oxyethylene polyol obtained in the following manner. Namely, propylene oxide is subjected to ring opening addition polymerization to glycerol as an initiator by using a potassium hydroxide catalyst, followed by purification to obtain a polyoxypropylene polyol having a molecular weight of 1,000. To 1,000 g of this polyoxypropylene polyol, 1,710 g of propylene oxide is subjected to ring opening addition polymerization by using a zinc hexacyanocobaltate complex catalyst having tert-butyl alcohol as a ligand, then 4,000 g of a mixture of propylene oxide and ethylene oxide (the mass ratio of propylene oxide:ethylene oxide=90:10) is subjected to ring opening addition polymerization. Then, the polyoxyalkylene polyol thus obtained is purified, and ethylene oxide is subjected to ring opening addition polymerization by using a potassium hydroxide catalyst. The number of functional groups is 3; the hydroxyl value is 24.0 mgKOH/g; the unsaturation value is 0.005 meq/g; the amount of terminal oxyethylene block groups is 14 mass %; and the amount of the total oxyethylene groups is 19 mass %.

Polyol a5: a polymer-dispersed polyol obtained by copolymerizing acrylonitrile and styrene in a polyoxypropylene oxyethylene polyol having a hydroxyl value of 34 mgKOH/g obtained in such a manner that propylene oxide is subjected to ring opening addition polymerization to glycerol as an initiator by using a potassium hydroxide catalyst, and ethylene oxide is subjected to ring opening addition polymerization to the terminal. The hydroxyl value is 22 mgKOH/g, and the amount of fine polymer particles is 35 mass %.

Cell opener: a polyoxyethylene/polyoxypropylene polyol having an average number of functional groups of 3, having a hydroxyl value of 48 mgKOH/g and having a content of oxyethylene groups of 80 mass %, which is obtained by ring opening addition polymerization of a mixture of propylene oxide and ethylene oxide to glycerol as an initiator by using a potassium hydroxide catalyst.

Crosslinking agent b1: diethanolamine

Crosslinking agent b2: polyoxyethylene polyol having an average number of hydroxyl groups of 4 and having a hydroxyl value of 562 mgKOH/g.

Urethane-forming catalyst c1: a dipropylene glycol solution of triethylenediamine (tradename: "TEDA-L33", manufactured by TOSOH CORPORATION).

Urethane-forming catalyst c2: a dipropylene glycol solution of bis-[(2-dimethylamino)ethyl]ether (tradename: "TOYOCAT-ET", manufactured by TOSOH CORPORATION).

Urethane-forming catalyst c3: tradename: "TOYOCAT-NCT", manufactured by TOSOH CORPORATION.

Silicone foam stabilizer d1: tradename: "SZ-1327", manufactured by Nippon Unicar Company, Limited.

Silicone foam stabilizer d2: tradename: "L-5309", manufactured by Nippon Unicar Company, Limited.

Dimethylpolysiloxanes e1 to e4: dimethylpolysiloxanes e1 to e4 have structures as identified in Table 1.

TABLE 1

| Structure | | Tradename | Average of n |
|---|---|---|---|
| e1 | Polydimethylsiloxane $(CH_3)_3-SiO-[(CH_3)_2SiO]_n-Si(CH_3)_3$ | Nippon Unicar Company, Limited L-45(10) | 13 |
| e2 | Polydimethylsiloxane $(CH_3)_3-SiO-[(CH_3)_2SiO]_n-Si(CH_3)_3$ | Nippon Unicar Company, Limited L-45(100) | 83 |
| e3 | Polydimethylsiloxane $(CH_3)_3-SiO-[(CH_3)_2SiO]_n-Si(CH_3)_3$ | Nippon Unicar Company, Limited L-45(1000) | 244 |
| e4 | Polydimethylsiloxane $(CH_3)_3-SiO-[(CH_3)_2SiO]_n-Si(CH_3)_3$ | Nippon Unicar Company, Limited L-45(10000) | 730 |

Blowing agent f: water

Polyisocyanate compound: a mixture of tolylene diisocyanate (mixture of 2,4-tolylene diisocyanate/2,6-tolylene diisocyanate=80/20 mass %) and polymethylenepolyphenyl polyisocyanate (mixture of tolylene diisocyanate/polymethylenepolyphenyl polyisocyanate=80/20 mass %), having an isocyanate group is content of 44.8% (tradename: "CORONATE 1021", manufactured by Nippon Polyurethane Industry Co., Ltd.).

Examples 1 to 8 and Comparative Examples 1 to 5

A flexible polyurethane foam was prepared in the blending ratio as shown in Tables 2 to 4. Among the materials shown in Tables 2 to 4, an isocyanate compound and a mixture (polyol-containing mixture) of all materials except for the polyisocyanate compound were adjusted to 25° C.±1° C., and the polyisocyanate compound was added to the polyol-containing mixture so as to agree with the isocyanate indices as shown in Tables 2 to 4. Thereafter, the mixture was mixed and stirred by means of a high speed mixer (3,000 rpm) for 5 seconds, and it was immediately injected into a mold having an internal dimension of 400 mm in length and width and 100 mm in height, which was heated at 60° C., and closed. After 6 minutes of curing, the obtained flexible polyurethane foam was removed from the mold, then it was left to stand for at least 24 hours. Thereafter, various physical properties were measured.

Further, the overall density, the core density, the 25% hardness (ILD), the rebound resilience of the core, the tear strength, the tensile strength, the elongation, the dry set, the wet set, and the hysteresis loss were measured in accordance with JIS K6400 (1997).

Here, as a pressure plate used for the measurement of hysteresis loss, a pressure plate (Tekken Plate) in accordance with JIS E7104 (2002) was used.

For the measurements of the core density and the rebound resilience of the core, a sample obtained by removing the skin portion from the center portion of the foam and cutting such a foam into a size of 100 mm in length and width and 50 mm in height, was used.

In the test for obtaining the load-deflection curve, the measurement was carried out by using a pressure plate (so-called Tekken Plate) of an oval shape having a long diameter A of 300 mm, a short diameter B of 250 mm and a thickness C of at least 35 mm in accordance with JIS E7104 (2002) and by applying a load at a constant rate of 1.7 mm/sec. From the load-deflection curve, the deflection (mm) on pressure side under a load of 500 N (Newton load) was obtained. The deflection difference Y (mm) on pressure side was obtained from the deflection (mm) on pressure side under a load of 900 N and the deflection (mm) on pressure side under a load of 500 N.

The 25% hardness (ILD) is represented by X, and the value y was calculated by the following formula (3).

$$y = -0.000370842X^2 + 0.225401X - 10.5013 \quad (3)$$

As the vibration characteristics, the resonance frequency (Hz), the transmissibility at resonance frequency (the absolute displacement measured) and the transmissibility at 6 Hz (the absolute displacement measured) were evaluated. The resonance frequency, the transmissibility at resonance frequency and the transmissibility at 6 Hz were measured by methods in accordance with JASO B407-87 (1987). As the conditions for measuring the vibration characteristics, a Tekken Plate (load: 490 N) was used as a pressure plate, and the vibration total amplitude was adjusted to be 5 mm.

TABLE 2

| Materials (part(s) by mass) | Examples | | | |
|---|---|---|---|---|
| | 1 | 2 | 3 | 4 |
| Polyol a1 | 40 | 40 | 40 | 40 |
| Polyol a2 | 60 | 60 | 60 | 60 |
| Polyol a3 | | | | |
| Polyol a4 | | | | |
| Polyol a5 | | | | |
| Cell opener | 0.5 | 0.5 | 0.5 | 0.5 |
| Crosslinking agent b1 | 0.2 | 0.2 | 0.2 | 0.2 |
| Crosslinking agent b2 | 0.6 | 0.6 | 0.6 | 0.6 |
| Urethane-forming catalyst c1 | 0.23 | 0.23 | 0.23 | 0.23 |
| Urethane-forming catalyst c2 | 0.06 | 0.06 | 0.06 | 0.06 |
| Urethane-forming catalyst c3 | 0.15 | 0.15 | 0.15 | 0.15 |
| Silicone foam stabilizer d1 | 0.7 | 0.7 | 0.7 | |
| Silicone foam stabilizer d2 | | | | 0.7 |
| Polydimethylsiloxane e1 | 0.01 | 0.03 | | |
| Polydimethylsiloxane e2 | | | 0.0006 | 0.0015 |
| Polydimethylsiloxane e3 | | | | |
| Polydimethylsiloxane e4 | | | | |
| Blowing agent f | 3.8 | 3.8 | 3.8 | 3.8 |
| Isocyanate index | 105 | 105 | 105 | 105 |
| Overall density (kg/m$^3$) | 43.5 | 42.9 | 44.2 | 45.4 |
| Core density (kg/m$^3$) | 39.2 | 37.9 | 40.2 | 41.9 |
| 25% hardness (ILD) (N/314 cm$^2$) | 245 | 235 | 287 | 282 |
| X in the formula (2) | | | | |
| Core rebound resilience (%) | 67 | 69 | 69 | 70 |
| Tear strength (N/cm) | 7.1 | 6.9 | 5.8 | 5.2 |
| Tensile strength (kPa) | 125 | 120 | 72 | 94 |
| Elongation (%) | 90 | 90 | 75 | 87 |
| DRY SET (%) | 3.3 | 3.5 | 3.1 | 4.3 |
| WET SET (%) | 18.7 | 18.7 | 13.1 | 16.4 |
| Hysteresis loss (%) | 22.0 | 23.6 | 22.4 | 21.7 |
| Deflection on 500 N pressure side (mm) | 29 | 31 | 32 | 24 |
| Deflection difference Y on pressure side of 900 N-500 N (mm) | 24.4 | 23.6 | 28.1 | 28.0 |
| Value y in the formula (3) | 22.5 | 22.0 | 23.6 | 23.6 |
| Resonance frequency (Hz) | 3.63 | 3.60 | 3.38 | 3.38 |
| Transmissibility at resonance frequency | 3.07 | 2.56 | 3.85 | 5.08 |
| Transmissibility at 6 Hz | 0.71 | 0.79 | 0.60 | 0.58 |

TABLE 3

| Materials (part(s) by mass) | Examples | | | |
|---|---|---|---|---|
| | 5 | 6 | 7 | 8 |
| Polyol a1 | 40 | 40 | | |
| Polyol a2 | 60 | 60 | | |
| Polyol a3 | | | 60 | |
| Polyol a4 | | | | 60 |
| Polyol a5 | | | 40 | 40 |
| Cell opener | 0.5 | 0.5 | 0.5 | 0.5 |
| Crosslinking agent b1 | 0.2 | 0.2 | 0.2 | 0.2 |
| Crosslinking agent b2 | 0.6 | 0.6 | 0.6 | 0.6 |
| Urethane-forming catalyst c1 | 0.23 | 0.23 | 0.23 | 0.23 |
| Urethane-forming catalyst c2 | 0.06 | 0.06 | 0.06 | 0.06 |
| Urethane-forming catalyst c3 | 0.15 | 0.15 | 0.15 | 0.15 |
| Silicone foam stabilizer d1 | 0.7 | | 0.7 | 0.7 |
| Silicone foam stabilizer d2 | | 0.7 | | |
| Polydimethylsiloxane e1 | | | | |
| Polydimethylsiloxane e2 | | | | |
| Polydimethylsiloxane e3 | 0.0015 | | 0.0015 | 0.0015 |
| Polydimethylsiloxane e4 | | 0.0015 | | |
| Blowing agent f | 3.8 | 3.8 | 3.8 | 3.8 |
| Isocyanate index | 105 | 105 | 105 | 105 |
| Overall density (kg/m$^3$) | 44.9 | 45.4 | 45.1 | 45.5 |
| Core density (kg/m$^3$) | 41.1 | 41.6 | 41.5 | 42.9 |
| 25% hardness (ILD) (N/314 cm$^2$) | 281 | 271 | 261 | 272 |
| X in the formula (2) | | | | |
| Core rebound resilience (%) | 70 | 66 | 66 | 62 |
| Tear strength (N/cm) | 5.6 | 6.5 | 7.3 | 7.5 |
| Tensile strength (kPa) | 93 | 88 | 110 | 121 |
| Elongation (%) | 88 | 80 | 90 | 88 |
| DRY SET (%) | 4.4 | 3.8 | 4.9 | 4.8 |
| WET SET (%) | 15.9 | 13.9 | 16.8 | 16.0 |
| Hysteresis loss (%) | 21.9 | 22.4 | 22.5 | 21.4 |
| Deflection on 500 N pressure side (mm) | 25 | 26 | 28 | 27 |
| Deflection difference Y on pressure side of 900 N-500 N (mm) | 27.6 | 29.2 | 25.2 | 26.0 |
| Value y in the formula (3) | 23.6 | 23.3 | 23.1 | 23.4 |
| Resonance frequency (Hz) | 3.40 | 3.45 | 3.51 | 3.52 |
| Transmissibility at resonance frequency | 4.85 | 3.43 | 4.42 | 3.68 |
| Transmissibility at 6 Hz | 0.76 | 0.63 | 0.61 | 0.69 |

TABLE 4

| Materials (part(s) by mass) | Comparative Examples | | | | |
|---|---|---|---|---|---|
| | 1 | 2 | 3 | 4 | 5 |
| Polyol a1 | 40 | 40 | | | 40 |
| Polyol a2 | 60 | 60 | | | 60 |
| Polyol a3 | | | 60 | | |
| Polyol a4 | | | | 60 | |
| Polyol a5 | | | 40 | 40 | |
| Cell opener | 0.5 | 0.5 | 0.5 | 0.5 | 0.5 |
| Crosslinking agent b1 | 0.2 | 0.2 | 0.2 | 0.2 | 0.2 |
| Crosslinking agent b2 | 0.6 | 0.6 | 0.6 | 0.6 | 0.6 |
| Urethane-forming catalyst c1 | 0.23 | 0.23 | 0.23 | 0.23 | 0.23 |

TABLE 4-continued

| Materials (part(s) by mass) | Comparative Examples | | | | |
|---|---|---|---|---|---|
| | 1 | 2 | 3 | 4 | 5 |
| Urethane-forming catalyst c2 | 0.06 | 0.06 | 0.06 | 0.06 | 0.06 |
| Urethane-forming catalyst c3 | 0.15 | 0.15 | 0.15 | 0.15 | 0.15 |
| Silicone foam stabilizer d1 | 0.7 | | 0.7 | 0.7 | 0.7 |
| Silicone foam stabilizer d2 | | 0.7 | | | |
| Polydimethylsiloxane e1 | | | | | |
| Polydimethylsiloxane e2 | | | | | 3.0 |
| Polydimethylsiloxane e3 | | | | | |
| Polydimethylsiloxane e4 | | | | | |
| Blowing agent f | 3.8 | 3.8 | 3.8 | 3.8 | 3.8 |
| Isocyanate index | 105 | 105 | 105 | 105 | 105 |
| Overall density (kg/m³) | 44.9 | 44.7 | 44.9 | 45.0 | Unable to foam |
| Core density (kg/m³) | 40.4 | 40.7 | 42.4 | 42.6 | |
| 25% hardness (ILD) (N/314 cm²) X in the formula (2) | 217 | 209 | 223 | 234 | |
| Core rebound resilience (%) | 69 | 69 | 67 | 68 | |
| Tear strength (N/cm) | 8.1 | 7.8 | 6.2 | 7.9 | |
| Tensile strength (kPa) | 165 | 159 | 158 | 174 | |
| Elongation (%) | 126 | 126 | 112 | 124 | |
| DRY SET (%) | 4.5 | 4.6 | 5.0 | 5.1 | |
| WET SET (%) | 16.0 | 19.1 | 17.5 | 17.2 | |
| Hysteresis loss (%) | 19.4 | 19.4 | 20.9 | 20.2 | |
| Deflection on 500 N pressure side (mm) | 36 | 38 | 34 | 33 | |
| Deflection difference Y on pressure side of 900 N-500 N (mm) | 20.8 | 19.6 | 20.1 | 20.7 | |
| Value y in the formula (3) | 20.9 | 20.4 | 21.3 | 21.9 | |
| Resonance frequency (Hz) | 3.38 | 3.45 | 3.58 | 3.53 | |
| Transmissibility at resonance frequency | 4.70 | 3.80 | 4.20 | 3.73 | |
| Transmissibility at 6 Hz | 0.60 | 0.63 | 0.68 | 0.65 | |

As shown in Tables 2 to 4, in Examples 1 to 8, the foams obtained by foaming into a thickness of 100 mm showed a larger deflection difference on pressure side than that of Comparative Examples. Further, in Examples, since the value Y which is the deflection difference on pressure side of 900 N–500 N, becomes larger than the value y calculated from the formula (3), not only an excellent supported feeling was obtained but also a good result in the vibration characteristics was obtained.

INDUSTRIAL APPLICABILITY

The flexible polyurethane foam of the present invention is preferably used mainly for a seat cushion for an automobile, a seat back, a furniture supply and the like.

The entire disclosure of Japanese Patent Application No. 2004-338815 filed on Nov. 24, 2004 including specification, claims and summary are incorporated herein by reference in its entirety.

What is claimed is:

1. A flexible polyurethane foam obtained by reacting a high molecular weight polyoxyalkylene polyol or a polymer-dispersed polyol containing fine polymer particles in the high molecular weight polyoxyalkylene polyol, with a polyisocyanate compound in the presence of a catalyst, a blowing agent, a foam stabilizer, and a compound represented by the following formula (1) other than said foam stabilizer, wherein said compound is present in an amount of from 0.0001 to 0.0015 part by mass per 100 parts by mass of all active hydrogen compounds:

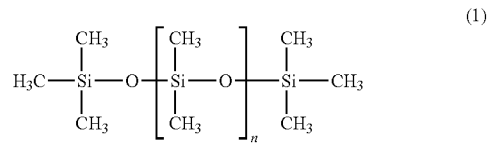

(1)

wherein the average of n is from 13 to 2,100, and which flexible polyurethane foam has a core density of from 30 to 70 kg/m³, and wherein with respect to a flexible polyurethane foam obtained by foaming into a thickness of 100 mm, X (N/314 cm²), which is the 25% hardness (ILD) measured in accordance with JIS K6400 (1997) and Y (mm), which is the value (difference in deflection on pressure side) obtained by subtracting the deflection on 500 N pressure side from the deflection on 900 N pressure side obtained from a load-deflection curve as measured by a pressure plate (Tekken Plate) in accordance with JIS E7104 (2002), satisfy a relation formula represented by the following formula (2):

$$Y \geq -0.000370842X^2 + 0.225401X - 10.5013 \qquad (2).$$

2. The flexible polyurethane foam according to claim 1, wherein the average of n in the compound represented by the formula (1) is from 21 to 2,100.

3. The flexible polyurethane foam according to claim 1, which has a core density of from 35 to 60 kg/m³.

4. The flexible polyurethane foam according to claim 1, wherein with respect to a flexible polyurethane foam obtained by foaming into a thickness of 100 mm, when the deflection on 500 N pressure side obtained from a load-deflection curve as measured by a pressure plate (Tekken Plate) in accordance with JIS E7104 (2002), is from 5.0 to 55.0 mm, Y (mm), which is the value (the difference in deflection on pressure side) obtained by subtracting the deflection on 500 N pressure side from the deflection on 900 N pressure side, is from 22.5 to 33.0 mm.

5. A seat for an automobile, which is made of the flexible polyurethane foam as defined in claim 1.

6. A process for producing a flexible polyurethane foam, which comprises reacting a high molecular weight polyoxyalkylene polyol or a polymer-dispersed polyol containing fine polymer particles in the high molecular weight polyoxyalkylene polyol, with a polyisocyanate compound in the presence of a catalyst, a blowing agent, a foam stabilizer, and a compound represented by the following formula (1) other than said foam stabilizer, wherein said compound is present in an amount of from 0.0001 to 0.0015 part by mass per 100 parts by mass of all active hydrogen compounds:

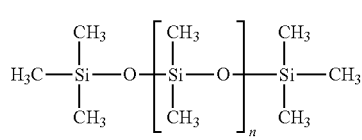

(1)

wherein the average of n is from 13 to 2,100, and which flexible polyurethane foam has a core density of from 30 to 70 kg/m³, and wherein with respect to a flexible polyurethane foam obtained by foaming into a thickness of 100 mm, X (N/314 cm²), which is the 25% hardness (ILD) measured in accordance with JIS K6400 (1997) and Y (mm), which is the value (difference in deflection on pressure side) obtained by subtracting the deflection on 500 N pressure side from the deflection on 900 N pressure side obtained from a load-deflection curve as measured by a pressure plate (Tekken Plate) in accordance with JIS E7104 (2002), satisfy a relation formula represented by the following formula (2):

$$Y \geq -0.000370842 X^2 + 0.225401 X - 10.5013 \quad (2).$$

7. The process for producing a flexible polyurethane foam according to claim 6, wherein the average of n in the compound represented by the formula (1) is from 21 to 2,100.

8. The process for producing a flexible polyurethane foam according to claim 6, wherein at least one member selected from water and an inert gas is used as the blowing agent.

9. The flexible polyurethane foam according to claim 1, wherein the high molecular weight polyoxyalkylene polyol is present.

10. The flexible polyurethane foam according to claim 1, wherein the polymer-dispersed polyol containing fine polymer particles in the high molecular weight polyoxyalkylene polyol is present.

11. The flexible polyurethane foam according to claim 1, wherein the foam stabilizer is a silicone foam stabilizer.

12. The flexible polyurethane foam according to claim 1, wherein the compound of formula (1) is present in an amount of from 0.0003 to 0.1 part by mass per 100 parts by mass of all active hydrogen compounds.

13. The flexible polyurethane foam according to claim 1, wherein the 25% hardness is from 180 to 500 N/314 cm².

14. The flexible polyurethane foam according to claim 13, wherein the 25% hardness is 180 to 400 N/314 cm².

15. The flexible polyurethane foam according to claim 4, wherein Y (mm) is from 27.0 to 33.0 mm.

16. The flexible polyurethane foam according to claim 1, wherein said reacting is carried out in the presence of a crosslinking agent.

17. The flexible polyurethane foam according to claim 1, wherein said reacting is carried out in the presence of, in addition to said high molecular weight polyoxyalkylene polyol, a polyoxyalkylene polyol having a high oxyethylene content, as a cell opener.

18. A flexible polyurethane foam obtained by reacting a high molecular weight polyoxyalkylene polyol or a polymer-dispersed polyol containing fine polymer particles in the high molecular weight polyoxyalkylene polyol, with a polyisocyanate compound in the presence of a catalyst, a blowing agent, a foam stabilizer, and a compound represented by the following formula (1) other than said foam stabilizer, wherein said compound is present in an amount of from 0.0001 to 0.0015 part by mass per 100 parts by mass of all active hydrogen compounds:

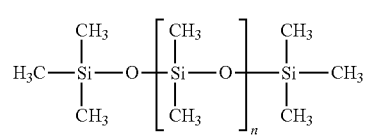

(1)

wherein the average of n is from 13 to 2,100, and which flexible polyurethane foam has a core density of from 30 to 70 kg/m³, and wherein with respect to a flexible polyurethane foam obtained by foaming into a thickness of 100 mm, when the deflection on 500 N pressure side obtained from a load-deflection curve as measured by a pressure plate (Tekken Plate) in accordance with JIS E7104 (2002), is from 5.0 to 55.0 mm, Y (mm) is from 22.5 to 33.0 mm, wherein Y is the value (the difference in deflection on pressure side) obtained by subtracting the deflection on 500 N pressure side from the deflection on 900 N pressure side.

19. The flexible polyurethane foam according to claim 1, wherein the average of n in the compound represented by the formula (1) is from 730 to 2,100.

* * * * *